(12) United States Patent
Homa et al.

(10) Patent No.: US 8,558,994 B2
(45) Date of Patent: Oct. 15, 2013

(54) EFPI SENSOR

(75) Inventors: Daniel S. Homa, Blacksburg, VA (US); Robert M. Harman, Troutville, VA (US); Brooks A. Childers, Christianburg, VA (US); Alexander M. Barry, Roanoke, VA (US); Brian S. Lucas, Christianburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 243 days.

(21) Appl. No.: 12/958,712

(22) Filed: Dec. 2, 2010

(65) Prior Publication Data

US 2011/0170116 A1    Jul. 14, 2011

Related U.S. Application Data

(60) Provisional application No. 61/294,240, filed on Jan. 12, 2010.

(51) Int. Cl.
*G01L 1/24* (2006.01)
*G01B 9/02* (2006.01)
*G02B 6/00* (2006.01)

(52) U.S. Cl.
USPC ............................. 356/35.5; 356/480; 385/12

(58) Field of Classification Search
USPC .................. 356/35.5, 519, 241.1, 480; 385/12
See application file for complete search history.

(56) References Cited

U.S. PATENT DOCUMENTS

| | | | |
|---|---|---|---|
| 5,044,723 A * | 9/1991 | MacDonald | ..................... 385/12 |
| 5,301,001 A | 4/1994 | Murphy et al. | |
| 6,055,080 A | 4/2000 | Furstenau et al. | |
| 6,056,436 A * | 5/2000 | Sirkis et al. | .................... 374/161 |
| 6,069,686 A * | 5/2000 | Wang et al. | ................... 356/35.5 |
| 6,097,478 A | 8/2000 | Berthold et al. | |
| 6,452,667 B1 * | 9/2002 | Fernald et al. | ............... 356/73.1 |
| 6,630,658 B1 | 10/2003 | Bohnert et al. | |
| 6,687,011 B1 * | 2/2004 | Lee et al. | ....................... 356/480 |
| 7,104,141 B2 * | 9/2006 | Zerwekh et al. | ................ 73/800 |
| 7,421,905 B2 * | 9/2008 | Zerwekh et al. | ................ 73/800 |
| 2002/0159671 A1 * | 10/2002 | Boyd et al. | ....................... 385/12 |
| 2005/0013526 A1 | 1/2005 | Lee et al. | |
| 2006/0289724 A1 * | 12/2006 | Skinner et al. | ................ 250/221 |
| 2008/0154317 A1 * | 6/2008 | Loebel | .............................. 607/2 |
| 2011/0120226 A1 * | 5/2011 | Dennison et al. | ............... 73/705 |

FOREIGN PATENT DOCUMENTS

KR    199914611    4/1999

OTHER PUBLICATIONS

International Search Report and Written Opinion dated Aug. 18, 2011 for Application No. PCT/US2010/062003.
Didomenico, L., et al.; "Quantum Interferometric Sensors"; Proc. of SPIE, vol. 5359, p. 169-176, 2004.

(Continued)

*Primary Examiner* — Gregory J Toatley
*Assistant Examiner* — Dominic J Bologna
(74) *Attorney, Agent, or Firm* — Cantor Colburn LLP

(57) ABSTRACT

An apparatus for estimating a property, the apparatus includes: a hollow core tube having a first opening and a second opening; a first optical waveguide disposed within the first opening; and a second optical waveguide disposed within the second opening and spaced a distance from the first optical waveguide, the distance being related to the property; wherein a portion of at least one of the optical waveguides within the tube is perimetrically isolated from the tube.

21 Claims, 4 Drawing Sheets

(56) References Cited

OTHER PUBLICATIONS

Kujawinska, M., et al., "New Generation of Full-Field Interferometric Sensors", Proceedings of the Symposium on Photonics Technologies for 7th Framework Program, p. 463-466, 2006.

Sathitanon, N., et al., "A Fiber Optic Interferometric Sensor for Dynamic Measurement", International Journal of Computer Science and Engineering, vol. 2, No. 2; p. 63-66.

Leng, J.S., et al.; "Structural Health Monitoring of Concrete Cylinders Using Protected Fibre Optic Sensors"; Institute of Physics Publising, Smart Materials and Structures; vol. 15, p. 302-308; 2006.

Park, S.W.; et al.; "Feedback Controlled Nano-Positioner Using Fiber Optic EFPI Sensor with Novel Demodulation Technique"; Proceedings of SPIE—The International Society for Optical Engineering, v.5763, pp. 284-290.

International Search Report and Written Opinion for Application No. PCT/US2011/031402 dated Oct. 20, 2011.

* cited by examiner

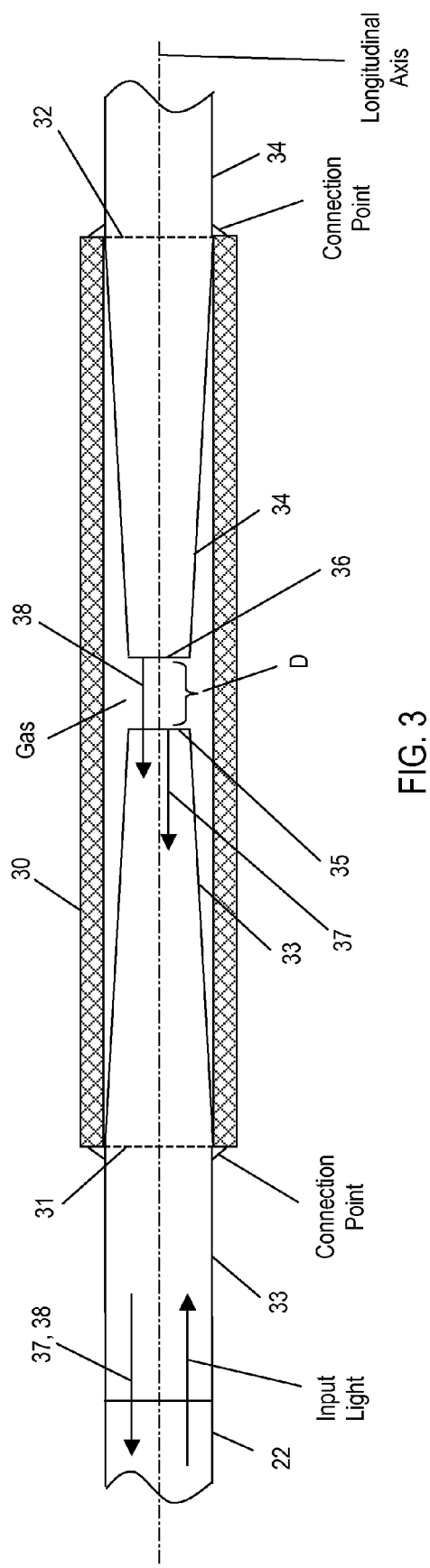
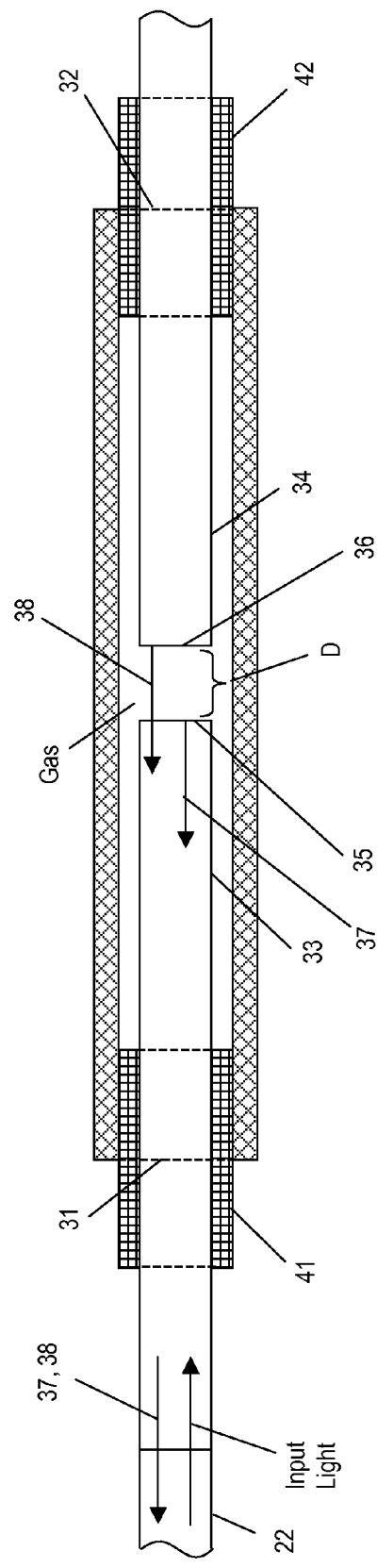
FIG. 3
FIG. 4

EFPI SENSOR

CROSS-REFERENCE TO RELATED APPLICATIONS AND PRIORITY CLAIM

This application claims the benefit under 35 U.S.C. §119(e) of U.S. Provisional Application Ser. No. 61/294,240, entitled "IMPROVED EFPI SENSOR", filed Jan. 12, 2010, which is incorporated herein by reference in its entirety.

BACKGROUND OF THE INVENTION

1. Field of the Invention

The present invention relates to an improved Extrinsic Fabry-Perot Interferometer (EFPI) sensor. More particularly, the EFPI sensor is configured to be disposed in a borehole penetrating the earth.

2. Description of the Related Art

In exploration and production of hydrocarbons, it is often necessary to drill a borehole into the earth to gain access to the hydrocarbons. Equipment and structures, such as borehole casings for example, are generally disposed into a borehole as part of the exploration and production. Unfortunately, the environment presented deep into the borehole can place extreme demands upon the equipment and structures disposed therein. For example, the equipment and structures can be exposed to high temperatures and pressures that can effect their operation and longevity.

Because optical fibers can withstand the harsh environment downhole, sensors using optical fibers are often selected for downhole applications. One type of sensor using optical fibers is the Extrinsic Fabry-Perot Interferometer (EFPI) sensor. The EFPI sensor can measure pressure or temperature for example by measuring a displacement of one optical fiber in relation to another optical fiber.

A prior art EFPI sensor 10 is illustrated in FIG. 1. The EFPI sensor 10 includes a hollow core tube 11. Disposed within the hollow core tube 11 at one end is a single-mode optical fiber 12. Disposed at the other end of the hollow core fiber 11 is a multimode optical fiber 13. A Fabry-Perot (FP) cavity is formed between the ends of the optical fibers 12 and 13 within the hollow core tube 11. The single mode optical fiber 12 provides input light to the FP cavity and receives light reflections from the FP cavity. The multimode optical fiber 13 acts as a reflector. The hollow core tube 11 is configured to guide the optical fibers 12 and 13 to and from each other while maintaining alignment.

Referring to FIG. 1, the input light enters the single mode optical fiber 12 and is partially reflected by a first glass-to-air interface 14 to produce first reflected output light 15. The input light not reflected by the first glass-to-air interface 14 travels through the FP cavity and is reflected by a second glass-to-air interface 16 to produce second reflected output light 17. The first reflection output light 15 interferes with the second reflection output light 17 to create an interference pattern or interferogram that depends on a difference in the optical path lengths traveled by the reflection output light 15 and 17. The intensity of total output light due to the interference pattern is related to the difference between the two optical paths. By measuring the intensity of the total light output at two different times, the displacement of the single mode optical fiber 12 with respect to the multimode optical fiber 13 can be measured. Hence, a property such as temperature or pressure can be estimated by measuring a change in intensity of the total light output.

In order to maintain proper alignment between the first glass-to-air interface 14 and the second glass-to-air interface 16, the prior art EFPI sensor 10 is made with a close tolerance between the outer diameter of the optical fibers 12 and 13 and the inner diameter of the hollow core tube 11. The tolerance is generally less than three microns. Unfortunately, the close tolerance can create friction, which in turn cause hysteresis in the response curve of the prior art EFPI sensor 10.

Therefore, what are needed are techniques to reduce or eliminate hysteresis in EFPI sensors.

BRIEF SUMMARY OF THE INVENTION

Disclosed is an apparatus for estimating a property, the apparatus includes: a hollow core tube having a first opening and a second opening; a first optical waveguide disposed within the first opening; and a second optical waveguide disposed within the second opening and spaced a distance from the first optical waveguide, the distance being related to the property; wherein a portion of at least one of the optical waveguides within the tube is perimetrically isolated from the tube.

Also disclosed is a system for estimating a property, the system includes: a hollow core tube having a first opening and a second opening; a first optical waveguide disposed within the first opening; and a second optical waveguide disposed within the second opening and spaced a distance from the first optical waveguide, the distance being related to the property, a portion of at least one of the optical waveguides within the tube being perimetrically isolated from the tube; a light source in optical communication with the first optical waveguide and configured to transmit an input light signal; and a light detector in optical communication with the first optical waveguide and configured to detect light reflections of the input light signal wherein the light reflections are related to the distance.

Further disclosed is a method for estimating a property, the method includes: using an Extrinsic Fabry-Perot Interferometer sensor, the sensor having a hollow core tube comprising a first opening and a second opening; a first optical waveguide disposed within the first opening; and a second optical waveguide disposed within the second opening and spaced a distance from the first optical waveguide, the distance being related to the property, a portion of at least one of the optical waveguides within the tube being perimetrically isolated from the tube; transmitting input light into the first optical fiber; and detecting reflections of the input light; and estimating the property from the reflections.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 3 depicts aspects of the EFPI sensor having an optical fiber with a taper;

FIG. 4 depicts aspects of the EFPI sensor having optical fibers each with a reduced diameter and supported by support tubes.

DETAILED DESCRIPTION OF THE INVENTION

Disclosed are exemplary embodiments of techniques for producing an Extrinsic Fabry-Perot Interferometer (EFPI) sensor having a response curve with little or no hysteresis. The reduction in hysteresis results from eliminating friction between at least one of the waveguides (e.g., optical fibers) disposed in a hollow core tube. Without hysteresis, the response curve can be substantially linear in one embodiment.

Figure 1:
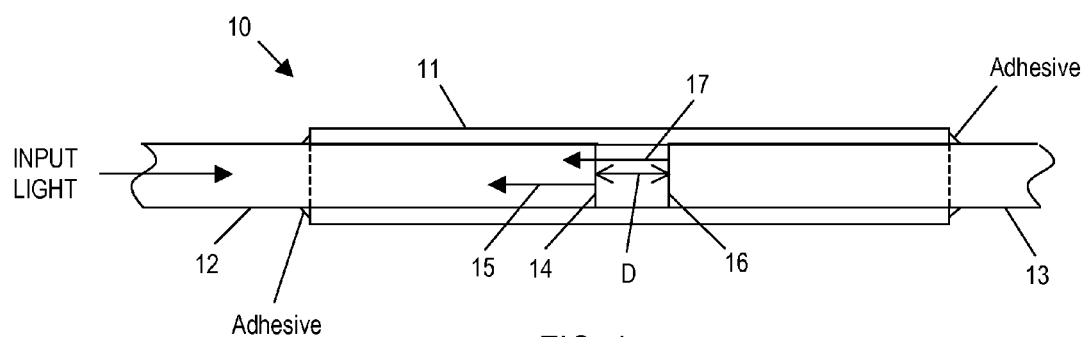
FIG. 1 illustrates a prior art EFPI sensor.
Figure 2:
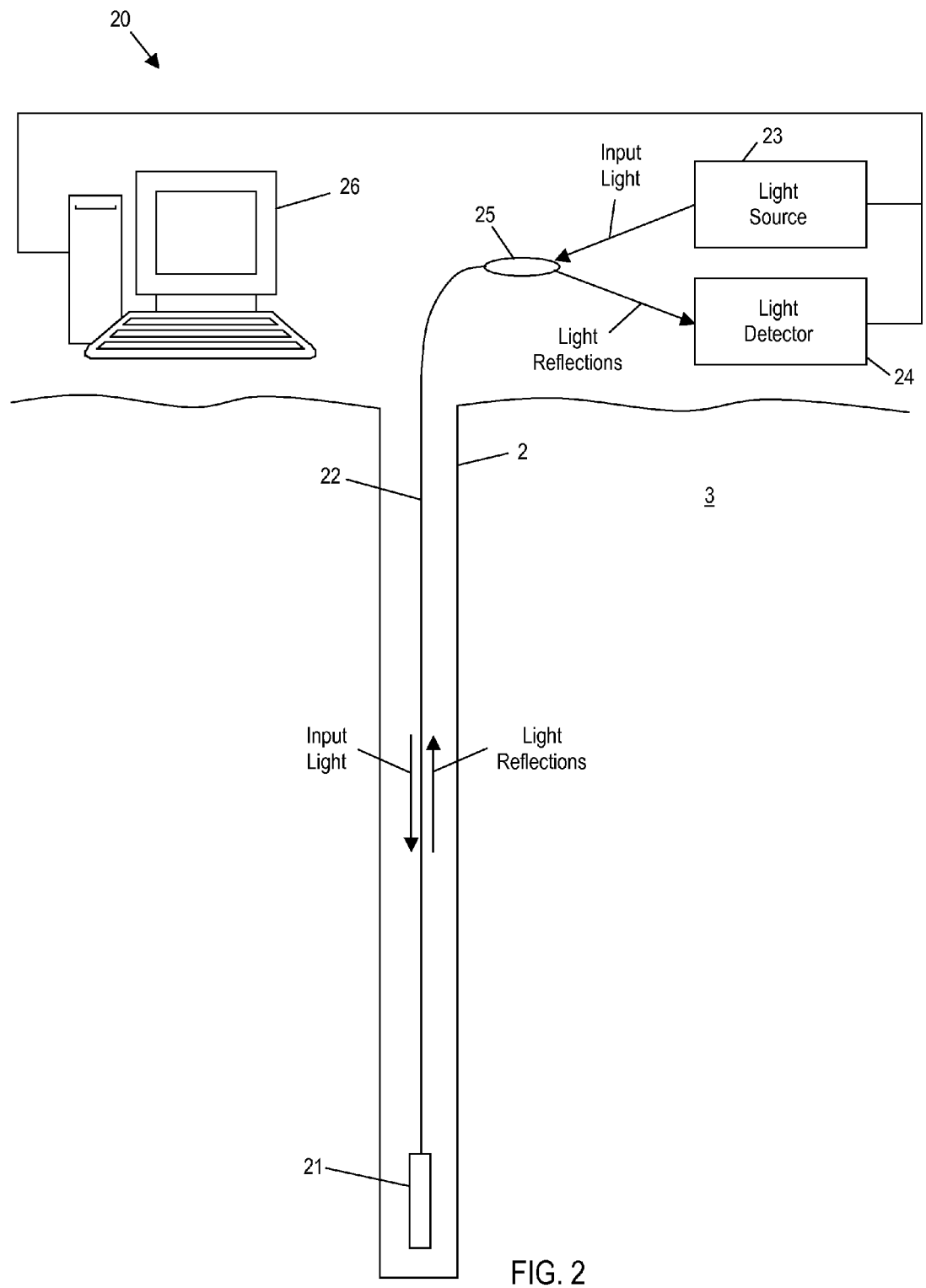
FIG. 2 illustrates an exemplary embodiment of an EFPI sensor system with the sensor disposed in a borehole penetrating the earth.

Reference may now be had to FIG. 2. FIG. 2 illustrates an exemplary embodiment of an EFPI sensor system 20. The EFPI sensor system 20 includes an EFPI sensor 21 configured to be disposed in a borehole 2 penetrating the earth 3. Being configured for operation in the borehole 2 includes being operable at the high temperatures and pressures encountered downhole.

Still referring to FIG. 2, the EFPI sensor 21 is coupled to surface optoelectronics by way of a communication optical fiber 22. In an alternative embodiment, some or all of the optoelectronics can be disposed downhole. The surface optoelectronics include a light source 23, such as a laser diode, and a light detector 24. The light source 23 is configured to transmit input light to the EFPI sensor 21 while the light detector 24 is configured to receive and measure light reflections from the sensor 21. An optical coupler 25 is configured to couple the light source 23 and the light detector 24 to the communications optical fiber 22. A computer processing system 26 may be coupled to the light source 23 and the light detector 24 and configured to operate the EFPI sensor system 20. In addition, the computer processing system 26 may process interference patterns generated by light reflections from the EFPI sensor 21 to estimate a property being measured.

Reference may now be had to FIG. 3. FIG. 3 illustrates a cross-sectional view of the EFPI sensor 21. The EFPI sensor 21 includes a hollow core tube 30 (such as a hollow core optical fiber) with two openings, a first opening 31 and a second opening 32. Disposed in the first opening 31 is a first optical waveguide 33, which is generally a single-mode fiber. Input light from the light source 23 is transmitted to the first optical waveguide 33 by way of the communication optical fiber 22. The first optical waveguide 33 is connected or attached at the point of entry at the first opening. The connection can be a fused (i.e., welded) connection or an adhesive (e.g., epoxy) connection. Disposed in the second opening 32 is a second optical waveguide 34, the first optical waveguide 33 and the second optical waveguide 34 forming a Fabry-Perot cavity. The second optical waveguide 34 is configured to reflect the light passing through the end of the first optical waveguide 33. In the embodiment of FIG. 3, the waveguides 33 and 34 are optical fibers and, thus, are referred to as the first optical fiber 33 and the second optical fiber 34, respectively.

A first portion 37 of the input light is reflected at a first gas-glass interface 35 at the end of the first optical fiber 33. A second portion 38 of the input light that passes through the first gas-glass interface 35 is reflected by a second gas-glass interface 36 at the end of the second optical fiber 34. Thus, the first portion 37 of reflected light and the second portion 38 of reflected light form an interference pattern or interferogram that is related to the distance between the first gas-glass interface 35 and the second gas-glass interface 36. In one embodiment, the gas between the interfaces 35 and 36 is air. In other embodiments, the gas can be a generally inert gas such as argon or nitrogen. In yet another embodiment, a vacuum can be used in place of the gas.

The hollow core tube 30, the first optical fiber 33 and the second optical fiber 34 depicted in FIG. 3 have circular cross-sections. In alternative embodiments, the cross-sections of any of these components can have other shapes.

The light detector 24 is configured to receive the interference pattern, which may also be referred to as a fringe pattern. The computer processing system 26 is configured to determine the distance D between the two gas-glass interfaces and relate that distance to the property being estimated. The property can be any physical condition that causes the hollow core tube 30 to expand and/or contract thus causing the distance between the first gas-glass interface 35 and the second gas-glass interface 36 to change in relation to the expansion/contraction of the tube 30. Non-limiting examples of the property include pressure, temperature, strain, displacement, acceleration, or force. The estimates of the property can be relative with respect to other measurements of the property or absolute with respect to a standard.

Still referring to FIG. 3, the gas-glass interfaces of the first optical fiber 33 and the second optical fiber 34 are substantially in alignment such that the longitudinal axes of the hollow core tube 30 and the optical fibers 33 and 34 are substantially the same and the gas-glass interfaces are in planes perpendicular to the longitudinal axes. Hence, when in alignment, the end faces of the gas-glass interfaces are substantially parallel to each other to provide adequate fringe pattern visibility, which in turn provides for accurate measurements.

In one embodiment, the communication optical fiber 22 is the same as the first optical fiber 33. Alternatively, one continuous optical fiber may be formed by fusing the communication optical fiber 22 to the first optical fiber 33.

Still referring to FIG. 3, the ends of the first optical fiber 33 and the second optical fiber 34 within the hollow core tube 30 are tapered to prevent contact between each of the optical fibers 33 and 34 and the hollow core tube 30. The tapered ends are isolated from (i.e., not in contact with) the inner surface of the hollow core tube 30 for 360 degrees about the longitudinal axis of each of optical fibers 33 and 34. That is, the optical fibers 33 and 34 are not in contact with the hollow core tube 21 for the circumference or perimeter of each of the optical fibers 33 and 34. Hence, the optical fibers 33 and 34 in FIG. 3 may be described as being "perimetrically" (i.e., related to the perimeter) isolated from the hollow core tube 30 within the hollow core tube 30. A perimetrically isolated waveguide or fiber does not contact the hollow core tube 30 for 360 degrees around the perimeter of a cross-section of the waveguide or fiber within the tube 30. In one embodiment, a solution of hydrofluoric acid can be used to etch the optical fibers 33 and 34 to produce the taper.

One other advantage of having tapers for the optical fibers 33 and 34 is the portion of each fiber with the larger outside diameter provides a larger area for fusing to another optical fiber such as the communication optical fiber 22. The larger area allows more precise fusing with the proper alignment.

Reference may now be had to FIG. 4. FIG. 4 depicts aspects of another embodiment of the EFPI sensor 21. In the embodiment of FIG. 4, the outer diameter of each of the first optical fiber 33 and the second optical fiber 34 is significantly smaller than the inner diameter of the hollow core tube 30. The outer diameter of the optical fibers 33 and 34 is selected to be small enough so that the optical fibers 33 and 34 will not contact the inside of the hollow core tube 30. In addition, the outer diameter is selected to be small enough so that any anticipated debris or contamination particles will not wedge between the inside of the hollow core tube and the outside of the optical fibers 33 and/or 34. Hence, the optical fibers 33 and 34 in the embodiment of FIG. 4 may be described as being perimetrically isolated from the hollow core tube 30.

The embodiment of FIG. 4 includes a first support tube 41 into which the first optical fiber 33 is disposed and a second support tube 42 into which the second optical fiber 34 is disposed. The support tubes 41 and 42 provide support and shim the first optical fiber 33 and the second optical fiber 34 into alignment, respectively. In general, the first optical fiber 33 is connected to the first support tube 41 and the first support tube 41 is connected to the hollow core tube 30 at various connection points where the connections include fusing, adhesives, or other types of attachments. The second optical fiber 34 is connected similarly. The dimensions of the various components depicted in FIG. 4 are selected to provide rigidity to the perimetrically isolated portions of the first optical fiber 33 and the second optical fiber 34 within the hollow core tube 30.

Other embodiments of the EFPI sensor 21 can be implemented using various combinations of the techniques disclosed above. For example, in one embodiment, only the end of one of the first optical fiber 33 or the second optical fiber 34 may be tapered. Similarly, only one of the first optical fiber 33 or the second optical fiber 34 may be disposed in the first support tube 41 or the second support tube 42, respectively. In another embodiment, the first optical fiber 33 with a taper and/or the second optical fiber 34 with the taper may be disposed in the first support tube 41 and/or the second support tube 42, respectively.

In the embodiments presented above, the waveguides are optical fibers. An optical fiber can also be used to fabricate the hollow core tube 30. In one embodiment, the hollow core tube 30 has an outer diameter of about one micron. Accordingly, when the outer diameter of the hollow core tube 30 is one micron, the optical fibers disposed within the tube 30 will have outer diameters less than one micron taking into account the wall thickness of the tube 30.

In one embodiment, the EFPI sensor 21 is fabricated as a micro-electromechanical system (MEMS) using techniques used for fabricating semiconductor devices. Exemplary embodiments of these techniques include photolithography, etching and micromachining. As a MEMS device, the waveguides 33 and 34 and the hollow core tube 30 can be made from silicon as one non-limiting example.

Figure 5:
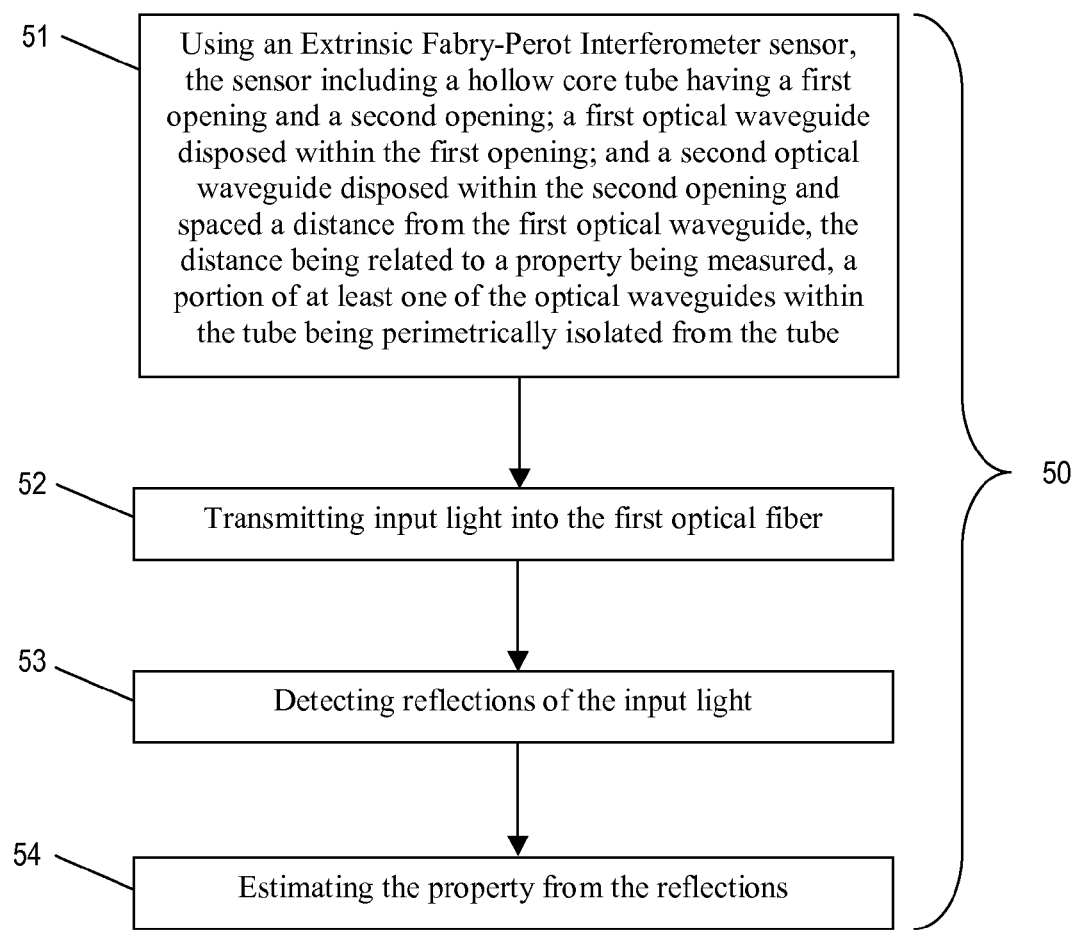
FIG. 5 presents an exemplary method for estimating a property using the EFPI sensor.

FIG. 5 presents one example of a method 50 for estimating a property in the borehole 2 penetrating the earth 3. The method 50 calls for (step 51) using the EFPI sensor 21. Further, the method 50 calls for (step 52) transmitting input light into the first optical waveguide 33. Further, the method 50 calls for (step 53) detecting reflections of the input light. Further, the method 50 calls for (step 54) estimating the property from the reflections.

In support of the teachings herein, various analysis components may be used, including a digital and/or an analog system. For example, the optoelectronics such as the light source 23, the light detector 24, or the computer processing system 25 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, motive force (such as a translational force, propulsional force or a rotational force), magnet, electromagnet, sensor, electrode, transmitter, receiver, transceiver, antenna, controller, optical unit, optical connector, optical splice, optical lens, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to two devices being either directly coupled or indirectly coupled via one or more intermediate devices.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property, the apparatus comprising:
   a hollow core tube comprising a first opening and a second opening;
   a first optical waveguide disposed within the first opening; and
   a second optical waveguide disposed within the second opening and spaced a distance from the first optical waveguide, the distance being related to the property;
   wherein at least one of the optical waveguides within the tube includes a tapered region disposed within and perimetrically isolated from the tube beyond a point of connection with the tube.

2. The apparatus of claim 1, wherein the apparatus is configured to be disposed in a borehole penetrating the earth.

3. The apparatus of claim 1, wherein at least one of the first optical waveguide and the second optical waveguide comprises an optical fiber.

4. The apparatus of claim 3, wherein an outer diameter of the hollow core tube is about one micron.

5. The apparatus of claim 4, wherein an outer diameter of the optical fiber is less than one micron.

6. The apparatus of claim 1, wherein the at least one of the optical waveguides tapers linearly beyond the point of connection with the tube to an end face.

7. The apparatus of claim 1, wherein an end face of one of the optical waveguides is aligned to be substantially parallel with an end face of the other optical waveguide.

8. The apparatus of claim 1, wherein a longitudinal axis of the first optical waveguide is substantially the same as a longitudinal axis of the second optical waveguide.

9. The apparatus of claim 1, wherein the first optical waveguide or the second optical waveguide is coupled to optoelectronics, the optoelectronics being configured to transmit light signals and receive light reflection signals related to the distance.

10. The apparatus of claim 1, further comprising a first support hollow core tube disposed within the first opening wherein the first optical waveguide is disposed within the first support hollow core tube.

11. The apparatus of claim 10, further comprising a second support hollow core tube disposed within the second opening wherein the second optical waveguide is disposed within the second support hollow core tube.

12. The apparatus of claim 1, wherein at least one of the optical waveguides is connected at a point of connection by solder or epoxy or combination thereof.

13. The apparatus of claim 1, wherein the first hollow core tube and at least one of the optical waveguides are comprised of glass and connected at a point of connection by fusion.

14. The apparatus of claim 1, wherein at least one of the optical waveguides comprises an outer diameter within the hollow core tube that is less than the outer diameter of the at least one of the optical waveguides external to the hollow core tube.

15. The apparatus of claim 1, wherein the property is at least one of pressure, temperature, strain, displacement, acceleration, or force.

16. The apparatus of claim 1, wherein the space between the first optical waveguide and the second optical waveguide is filled with at least one of a vacuum and a gas selected from a group consisting of air, nitrogen, and argon.

17. The apparatus of claim 1, where the apparatus is a micro-electromechanical system (MEMS).

18. A system for estimating a property, the system comprising:
a hollow core tube comprising a first opening and a second opening;
a first optical waveguide disposed within the first opening;
a second optical waveguide disposed within the second opening and spaced a distance from the first optical fiber, the distance being related to the property, a portion of at least one of the optical fibers within the tube includes a tapered region disposed within and perimetrically isolated from the tube beyond a point of connection with the tube;
a light source in optical communication with the first optical waveguide and configured to transmit an input light signal; and
a light detector in optical communication with the first optical waveguide and configured to detect light reflections of the input light signal wherein the light reflections are related to the distance.

19. The system of claim 18, further comprising a communication waveguide disposed between the first optical waveguide and at least one of the light source and the light detector and configured to communicate light signals.

20. A method for estimating a property, the method comprising:
using an Extrinsic Fabry-Perot Interferometer sensor, the sensor comprising a hollow core tube comprising a first opening and a second opening; a first optical waveguide disposed within the first opening; and a second optical waveguide disposed within the second opening and spaced a distance from the first optical waveguide, the distance being related to the property, a portion of at least one of the optical waveguides within the tube includes a tapered region disposed within and perimetrically isolated from the tube beyond a point of connection with the tube;
transmitting input light into the first optical waveguide;
detecting reflections of the input light; and
estimating the property from the reflections.

21. The method of claim 20, wherein the property is in a borehole penetrating the earth and the method further comprises disposing the sensor in the borehole.

* * * * *